United States Patent [19]
Glucksman et al.

[11] Patent Number: 5,901,637
[45] Date of Patent: May 11, 1999

[54] COMBINED BAKING OVEN AND AUTOMATIC BREAD BAKING APPARATUS

[75] Inventors: Dov Z. Glucksman, Wenham; Karl H. Weidemann, Hull, both of Mass.

[73] Assignee: Appliance Development Corporation, Danvers, Mass.

[21] Appl. No.: 09/055,652

[22] Filed: Apr. 6, 1998

[51] Int. Cl.[6] .............. A21B 1/00; A21D 8/00; A47J 27/00; A47J 37/01

[52] U.S. Cl. .............. 99/326; 99/331; 99/340; 99/348; 366/146; 366/314

[58] Field of Search .............. 99/339, 340, 348, 99/325–328, 331–335, 467, 468, 476, 483, 484, 486, 419–421 H; 366/69, 149, 96–98, 144–146, 314, 341, 601; 426/504, 512, 523; 219/400, 402, 391; 364/400

[56] References Cited

U.S. PATENT DOCUMENTS

| | | |
|---|---|---|
| 4,663,506 | 5/1987 | Bowen et al. . |
| 4,903,587 | 2/1990 | Nagasaka et al. ............ 99/325 |
| 4,951,559 | 8/1990 | Arao et al. ................. 99/348 |
| 4,959,517 | 9/1990 | Jump et al. . |
| 5,351,606 | 10/1994 | Matsuzaki ............ 366/146 X |
| 5,410,949 | 5/1995 | Yung ..................... 99/468 X |
| 5,445,061 | 8/1995 | Barradas . |
| 5,463,937 | 11/1995 | Belongia et al. . |
| 5,493,955 | 2/1996 | Belongia et al. . |
| 5,513,557 | 5/1996 | Chiang ..................... 99/327 |
| 5,525,781 | 6/1996 | Yahav et al. . |
| 5,568,764 | 10/1996 | Belongia et al. . |
| 5,584,233 | 12/1996 | Glucksman et al. . |
| 5,590,585 | 1/1997 | Morishita . |
| 5,605,090 | 2/1997 | Mantani et al. ............ 99/326 |
| 5,665,410 | 9/1997 | Turchany et al. . |
| 5,778,766 | 7/1998 | Wang ..................... 99/326 |

*Primary Examiner*—Timothy F. Simone
*Attorney, Agent, or Firm*—Pearson & Pearson

[57] ABSTRACT

A kitchen appliance in the form of an oven for baking, roasting and broiling is associated with a bread making apparatus featuring a bread baking pan adapted to be selectively placed into the oven. The oven includes heating elements at least at the top and bottom of the oven chamber. The bread making apparatus includes a metallic pan with a structure for locating the pan at a predetermined position within the oven chamber. In this position, a drive mechanism can rotate a blade for kneading dough in the pan.

16 Claims, 10 Drawing Sheets

COMBINED BAKING OVEN AND AUTOMATIC BREAD BAKING APPARATUS

BACKGROUND OF THE INVENTION

1. Field of the Invention

The invention relates to cooking apparatus and more particularly to a combined baking oven and automatic bread making apparatus.

2. Description of Related Art

During the past two decades different kinds of breadmaking machines have been introduced to the consumer market. Each is adapted for automatically mixing and kneading dough after the necessary ingredients have been put into a receptacle or pan, letting the dough rise and baking a loaf of bread at a predetermined temperature and time. Programmed electronic circuitry is integrated into this apparatus to execute the different steps in their correct order and timing in respect of the kind of bread chosen. In this way all the user has to do is to place the correct ingredients into the baking pan and select the bread type corresponding to the ingredients.

Conventional bread-making apparatus essentially includes a baking pan provided with a kneading blade or blades in its bottom portion to be rotated by an electric motor for a predesignated period. The pan has an open top and is removable from the appliance for extracting the ready loaf and for cleaning purposes. When the pan is inserted in a baking chamber, the open top is closed tightly by a cover. The baking chamber contains a bottom heating element to be energized to the correct temperature and timing by electronic control circuitry. The air heated in the baking chamber transmits the heat energy to the dough in the baking pan. An outer housing encloses the baking chamber and contains, inter alia, the electric motor and drive for rotating the kneading blade or blades, the electronic circuitry and a keyboard for selecting the desired bread type.

U.S. Letters Pat. No. 5,584,233 (1996) to Glucksman et al. and assigned to the same assignee as the present invention discloses a bread-making apparatus that overcomes certain drawbacks of prior art bread-making apparatus. The apparatus disclosed in the patent is characterized by hot-air circulation through the space between the baking chamber and the outer housing. This arrangement highly improves the baking procedure by creating uniform temperature all over the side, the bottom and the top of the baking pan, and, as a consequence, uniform bread quality. Another feature of this bread maker is the cool outer housing permitting its manufacture from a plastic material.

U.S. Letters Pat. No. 5,445,061 (1995) to Barradas discloses a combination bread-making machine and cooker. The appliance is rectangular in shape and includes a lateral chamber, a bottom chamber and an oven chamber. An intermediate wall between the oven chamber and lateral chamber carries a heating element and fan with a baffle to conduct and direct heated air into the oven chamber and against the side walls thereby to augment the heat in the chamber. The bread pan has a central aperture through the bottom that resides on a bottom support plate within the oven chamber. A motor-driven shaft extends up through that opening and is connected to a kneading blade. With this construction the ingredients can be added to the bread pan only after the bread pan is installed in the oven. If one attempts to fill the pan outside the oven chamber, steps must be taken to seal the central bottom aperture of the pan to prevent the ingredients from leaking. Consequently the housing surrounding the oven chamber of the Barradas patent opens to the front and back to provide top access to the pan.

U.S. Letters Pat. No. 5,493,955 to Belongia et al. is representative of a group of patents that disclose other embodiments of combined automatic breadmakers and oven appliances. This particular appliance has a laterally opening wide door. Specifically in this appliance a floor, enclosing surfaces and a door form the oven chamber. The door swings horizontally to create a front opening extending substantially to the oven floor to allow wide-side insertion and removal of a baking pan. When closed the door extends upwardly along the oven floor and rearwardly to a position directly above the pan. The pan has two driven kneading members based along its bottom for mixing dough. As in the Barradas patent it appears that the pan must be in position in the bottom of the oven chamber prior to the addition of ingredients to the pan. Consequently top access through the housing to the baking pan is required and the door is constructed to provide that access when it is opened.

U.S. Letters Pat. No. 5,590,585 to Morishita discloses another version of a breadmaker in which a pan is installed in a bread-making apparatus with a shaft that penetrates the bottom of the bread-making pan. As in the Belongia et al. patent a top cover is removed in order to add ingredients to the pan after it is installed in the bread making appliance.

Thus, each of the foregoing references are representative of appliances in which the bread-making pan must be positioned in the apparatus before ingredients can be added. This necessitates some access from the top of the apparatus as opposed to access merely from the front. If top access is not provided by a top opening member of the oven chamber, the overall height of the apparatus would be prohibitive. Top opening ovens pose another problem. Such construction eliminates the possibility of locating any type of heating element centrally of the top wall of the oven chamber. Using single heating elements, as in the floor can produce uneven heating and baking.

Generally such appliances sit on a counter to be stored and used under a wall cabinet. Other appliances are actually hung from a wall cabinet. With the popularity of such under-cabinet mounting there is a practical requirement for access to an oven chamber or the like solely through a front opening. For bread making appliances this means ingredients need to be added remotely from the oven chamber.

U.S. Letters Pat. No. 4,959,517 (1990) to Jump et al. discloses a microwave cooking assembly for various foods in which ingredients are added to a conventional mixing bowl. A top assembly serves as a cover and includes a self-contained stirrer with a paddle that moves through the food to mix the food. Various types of motor drives are disclosed including mechanical and electrical drives. However, the utilization of a separate cover with any sort of driving means complicates the overall structure and thereby increases the expense over other approaches in the prior art.

Consequently a need remains for a combined baking oven and automatic bread baking appliance that is adapted for front loading and that enables ingredients to be added remotely from the apparatus. Moreover, a need exists for an oven chamber in such an appliance that produces even heating and uniform cooking.

SUMMARY

Therefore, it is an object of this invention to provide a combination conventional heating oven and bread-making appliance that is adapted for under cabinet installations.

Another object of this invention is to provide a bread-making appliance with a pan adapted to be selectively mounted in the oven and to be operated as an integral portion of the oven and that is also adapted for conventional baking and roasting.

Still another object of this invention is to provide an appliance with a pan for being mounted inside the baking chamber for automatic kneading and raising dough and baking one loaf of bread from pre-specified ingredients filled into the pan remotely from the apparatus each time a certain kind of bread is required.

Yet another object of this invention is to provide a combined baking oven and automatic bread-making appliance that enables access to a bread pan entirely from the front of the apparatus.

Yet still another object of this invention is to provide a combined baking oven and automatic bread-making appliance that enables the bread pan to be removed from the apparatus and filled with ingredients remotely thereto.

In accordance with one aspect of this invention, a combination oven and bread-making appliance includes a housing having an oven chamber with a heating element, a lateral compartment and a bottom compartment. A removable bread-making pan has an open top, a closed bottom, a rotatable kneading blade and a first rotatable shaft connected at one end to the kneading blade and extending through the closed bottom. A second rotatable shaft extends between the bottom compartment and the oven chamber. Drive apparatus in the lateral compartment drives the second rotatable shaft. The removable bread-making pan is located at a predetermined position within the oven chamber whereby the first and second shafts are oriented to couple rotation of the second shaft to the first shaft to rotate the kneading blade.

In accordance with another aspect of this invention a combination oven and bread-making appliance includes a housing having an oven chamber, a lateral compartment and a bottom compartment formed therein. The oven chamber is bounded by top, back, bottom and side walls to form a front opening oven chamber. A door attaches to the housing for closing the front opening chamber. A removable bread-making pan has an open top, a closed bottom, a rotatable kneading blade and a kneading blade rotatable shaft connected at one end to the kneading blade and extending through the closed bottom. A drive unit in the housing drives the kneading blades when the pan is at a predetermined position established by locating elements. A heating element is located in the oven chamber at the top wall thereof.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF ILLUSTRATIVE EMBODIMENTS

Figure 1:
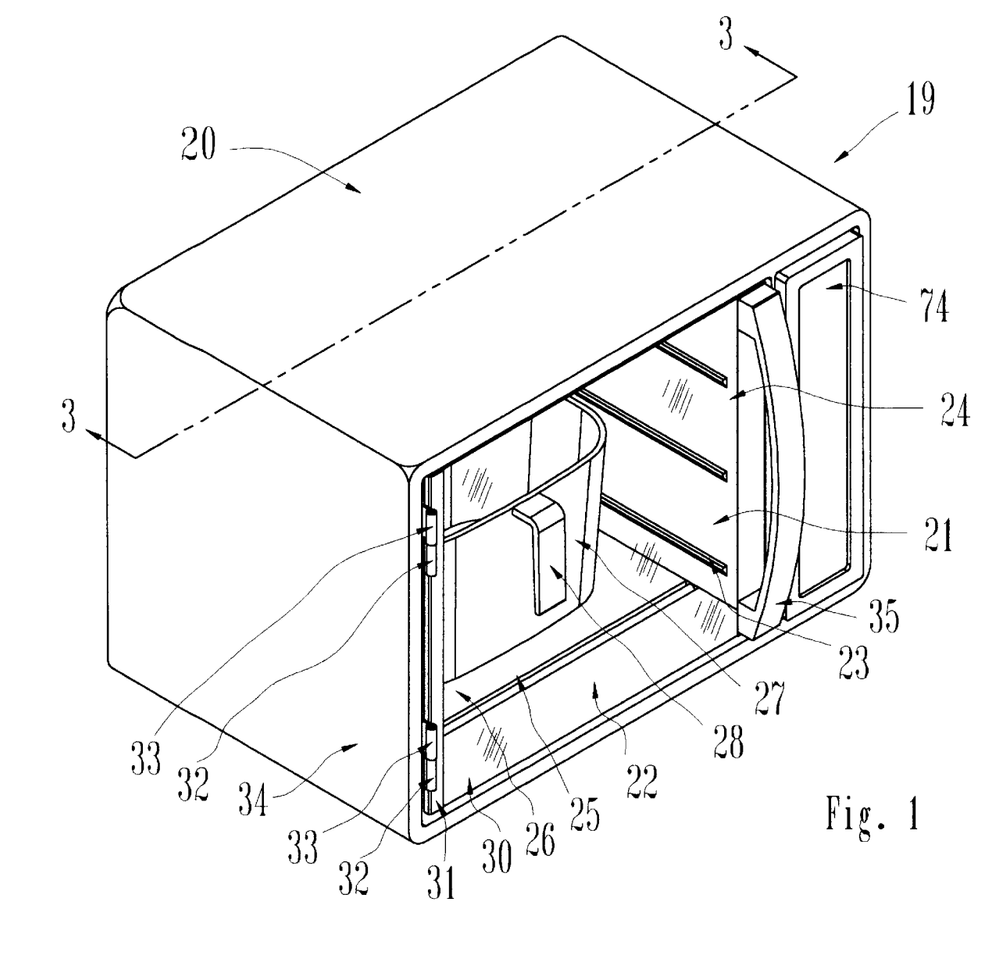
FIG. 1 is an isometric view of the assembled appliance, with the bread making apparatus mounted in an oven.

FIG. 1 illustrates an assembled appliance 19 in a closed or operating configuration. It comprises an outer housing or cabinet 20 that defines the top, bottom, back and sides of an oven chamber 21 with an open front closed by a glass-panelled door 22. Baking rack supports 23 are on the side walls 24 of the oven chamber 21. A sheathed heating element 25 is located in a channel at the bottom 26.

A bread baking pan 27 is mounted on a bottom 26 and has a handle or grip 28. A control panel 74 is located to the right of the door 22 in FIG. 1.

The door 22 includes a front panel 30, preferably of a glass or other transparent material. A hinge strap 31 is bonded to the glass panel along one vertical edge and includes hinge elements 32 that register with hinge elements 33 that attach to a side wall 34 off the oven chamber. When pinned, the hinge elements 32 and 33 produce a "left-opening" door that nests in the opening of the oven chamber 21. A handle 35 attaches to the other vertical edge to facilitate door operation. A magnetic or other type keeper can be provided to prevent inadvertent opening of the door as known in the art.

Figure 2:
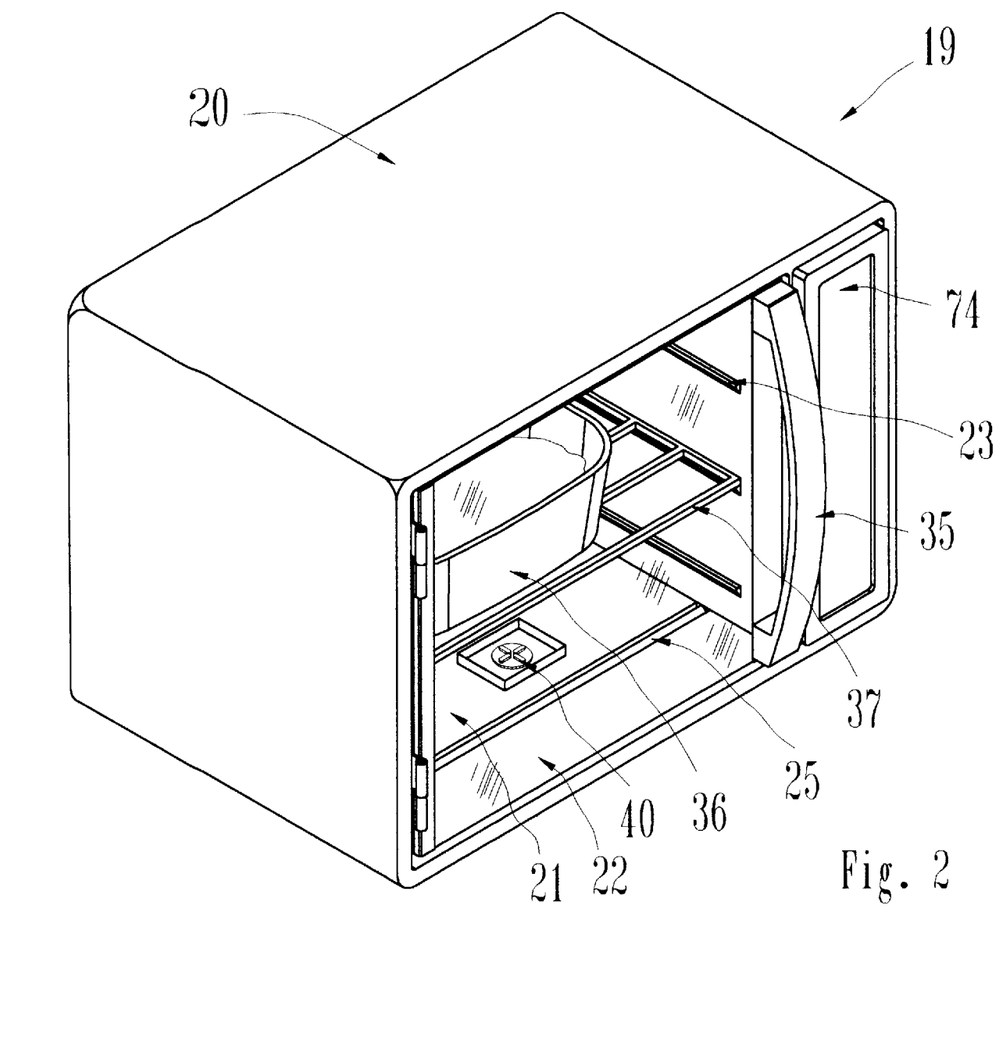
FIG. 2 is an isometric view of the appliance of FIG. 1 with the baking pan removed and with the oven used for preparing food.

FIG. 2 depicts the appliance 19 with a conventional pan 36 in the oven chamber 21. An oven rack 37 supports the pan 36. Rack supports 23 on the side walls carry the oven rack 37. This view again depicts the door 22 with its handle 35 and the bottom heating element 25. In this configuration a drive assembly 40 becomes visible. Thus, the bread pan 27 in FIG. 1 can be removed to allow the appliance to be used as a conventional oven using conventional cooking pans or other utensils.

Figure 3:
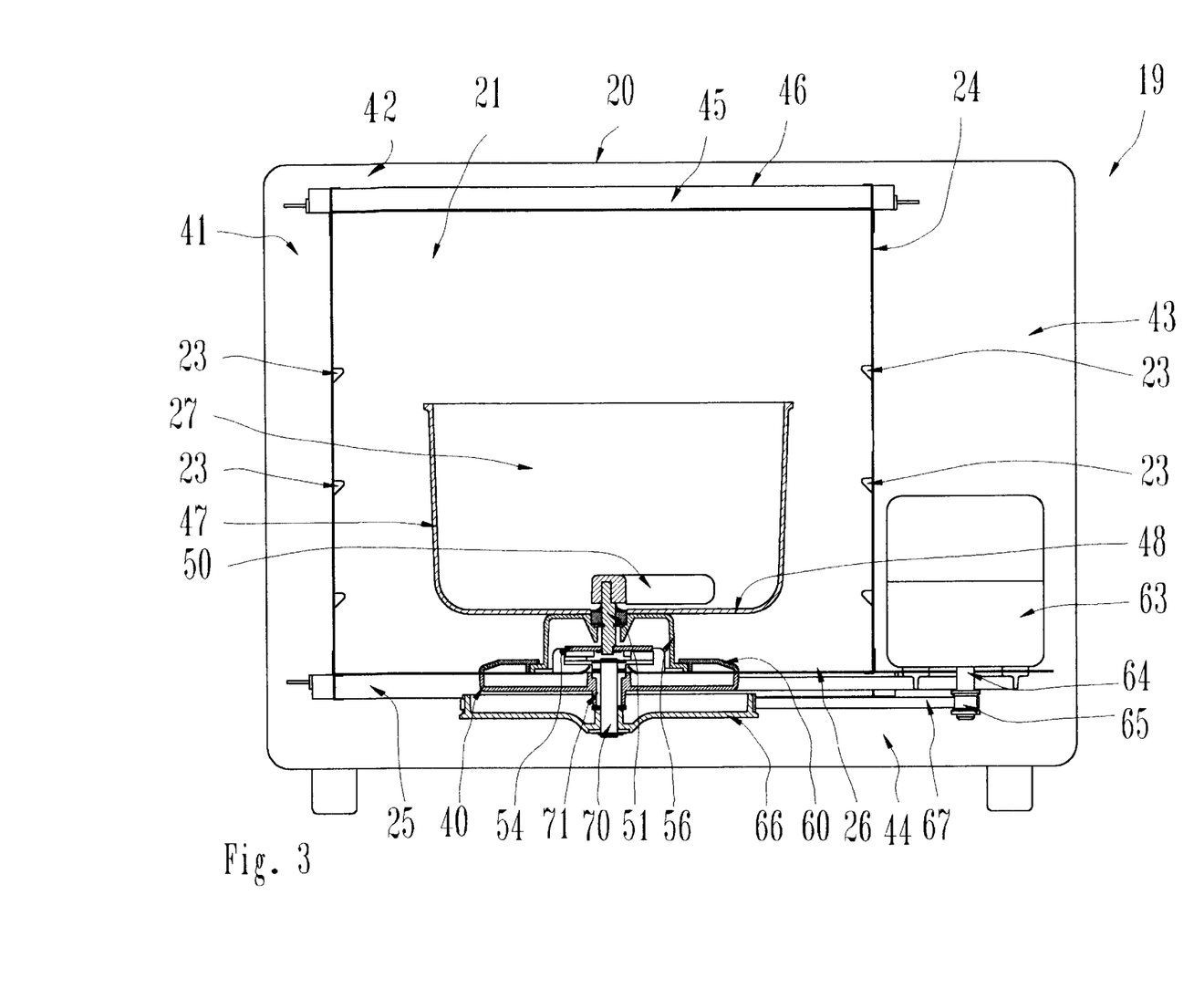
FIG. 3 is a section taken along lines 3—3 in FIG. 1.

FIG. 3 depicts the appliance 19 and, in more detail, the cabinet 20 that surrounds the oven chamber 21 on four sides. The cabinet 20 and oven chamber 21 are positioned to form a narrow air gap 41 between their respective side walls on the left and a narrow air gap 42 between their respective top walls. The distance between oven chamber 21 and cabinet 20 is greater on the right side of the drawing forming a lateral compartment 43 and between their respective bottom walls creating a shallow bottom compartment 44. The construction with such spaced-wall configurations is well known. It should be noted that the position of the lateral compartment 43 could as well be on the left side. Alternatively, the lateral compartment 43 could be created as a rear compartment by increasing the distance between the respective rear walls of the oven chamber 21 and outer cabinet 20. The use of the side lateral compartment represents a preferred compromise between the width and depth dimensions to the appliance 19.

Now referring to the function of the oven, while the bread baking pan 27 is removed, the side walls feature different baking rack supports 23 in a conventional manner for placing the food to be prepared on baking racks at different levels. The food is to be heated by the sheathed tubular heating element 25 mounted in the bottom 26 of the oven chamber 21 and an upper heating element 45 at the top wall 46, preferably with a reflector as described later. It will be understood that similar heaters may be attached to the back of the baking chamber in addition to or in lieu of the bottom heating element 25.

Figure 4:
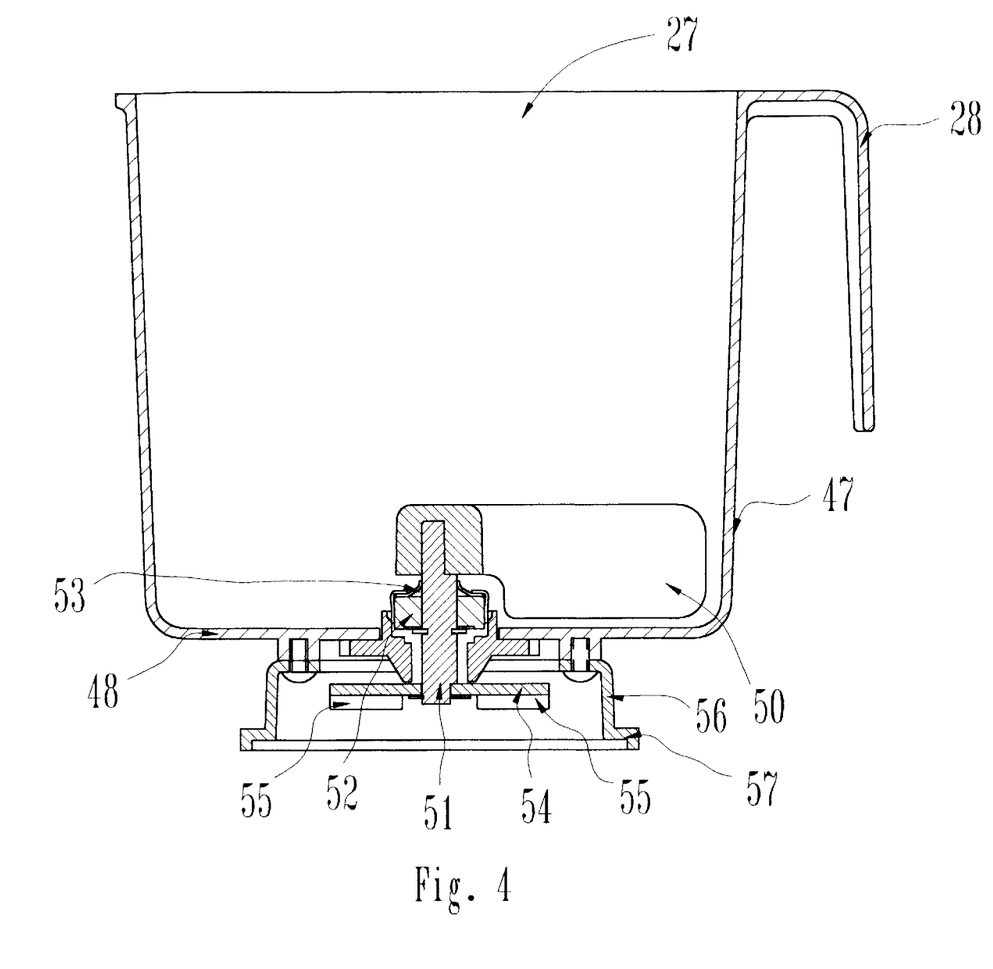
FIG. 4 is a vertical section of the bread making pan shown in FIG. 1.
Figure 5:
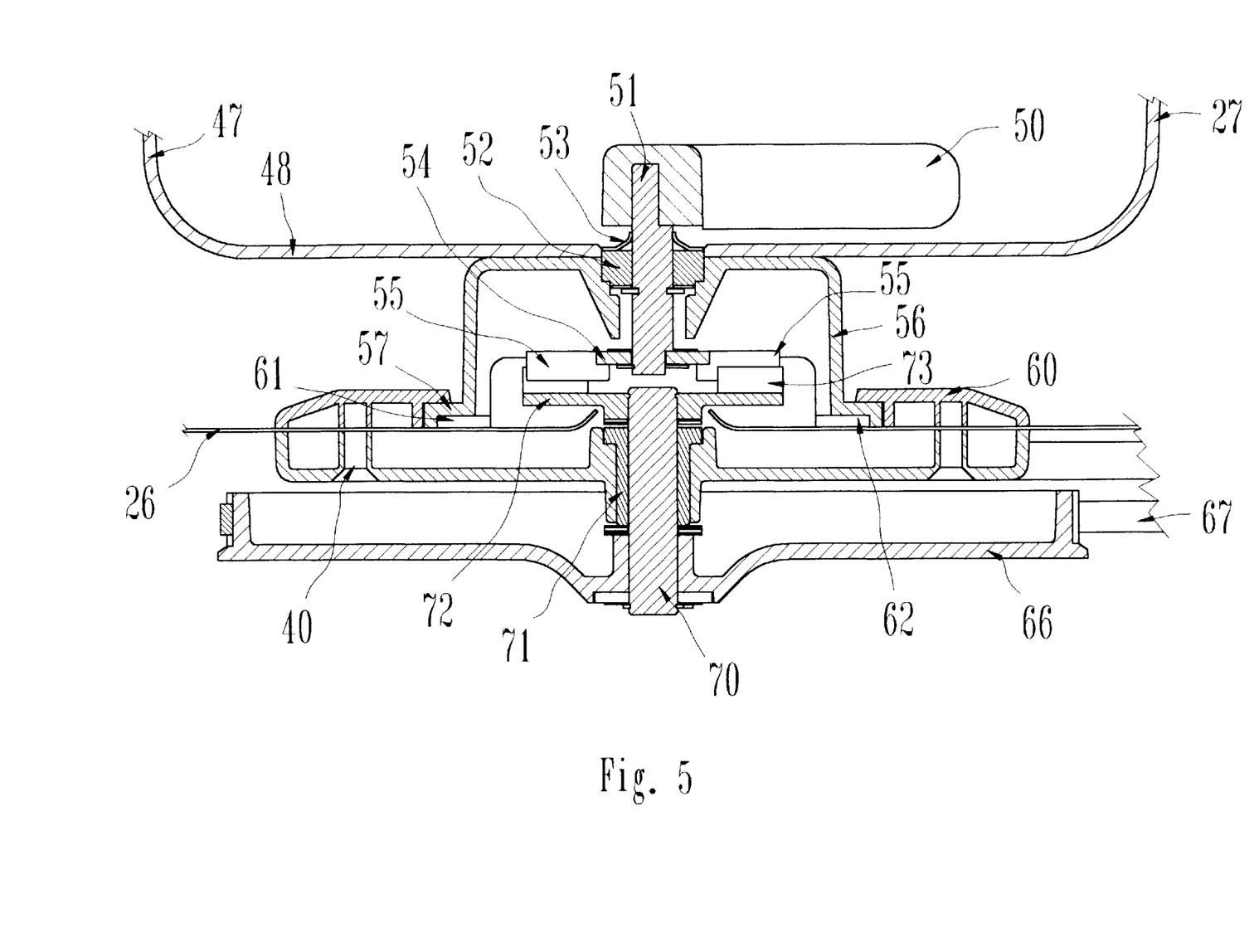
FIG. 5 is an enlarged section of the lower portion of FIG. 1, showing connection between chamber and baking pan and drive of the kneading blade.

Before continuing with the description of the general layout of the equipment, a full description of the baking pan 27 and its connection to the bottom of the chamber will facilitate an understanding of this invention. The bread making pan 27 shown in FIGS. 3 through 5 is in the form of a metallic vessel including slightly drafted side walls 47 and a flat bottom 48. Normally the pan 27 will be formed from a heat-conductive sheet metal such as aluminum. A rotary kneading blade 50 mounts to the upper end of a first vertical shaft 51. The shaft 51 penetrates through bottom 50 and is rotationally supported by a bearing 52 and shaft seal 53 mounted on the pan bottom. A coupling connector in the shape of a disk 54 with two radially and axially extending fins 55 is firmly attached to the bottom end of shaft 51 and serves for connection to a mechanism as described later. A bottom fitting 56 of the pan 26 is rigidly connected to the bottom wall 26 by two parallel side rails 57.

It can be seen that the bread making pan 27 is attached to the bottom 26 of the oven chamber by sliding the rails 57 parallel to the bottom 50 into a clamping device 60 which is shown in FIG. 5 at a larger scale, for better understanding. The clamping device 60 forms oppositely opening side-facing channels 61 and 62 that lie along parallel axes extending from the front to the back of the oven chamber 21. When inserted, friction between the rails 57 and the clamping device 60 may be sufficient to hold the pan 27 in a fixed position. Otherwise a detent or moveable and fixed end stops can be added to the clamping device 60.

Referring to FIGS. 3 and 5 kneading blade 50 is driven by an electric motor 63 which is vertically mounted in the lateral compartment 43 in a vertical alignment with its shaft 64 extending into the bottom compartment 44. A small-diameter pulley 65 drives a large-diameter pulley 66 by means of a belt 67, all being placed in the bottom compartment 44. The pulley 66 attaches to the bottom end of a second vertical shaft 70 which is held in a bearing 71. This bearing 71 and the clamping frame 60, which is riveted or screwed to the bottom wall 26 of the oven chamber align the shaft 70 at a predetermined position with the oven chamber 21. In this embodiment, when the pan 27 and rails 57 are properly located in the clamping frame 60, the shaft 51 is coaxial with the shaft 70.

Rotary connection between the aligned shafts 51 and 70 is made by a second coupling disk 72 provided with fins 73. As best shown in FIG. 5 the radial fins 55 and 73 overlap in the vertical direction. Should they interfere as the pan 27 is inserted, one or both coupling members 51 and 70 will rotate to an orientation that allows the radial fins 55 and 73 to pass by each other. Once positioned, however, rotation of the shaft 70 causes the fins 73 to engage the fins 55 and rotate the kneading blade 50.

Figure 6:
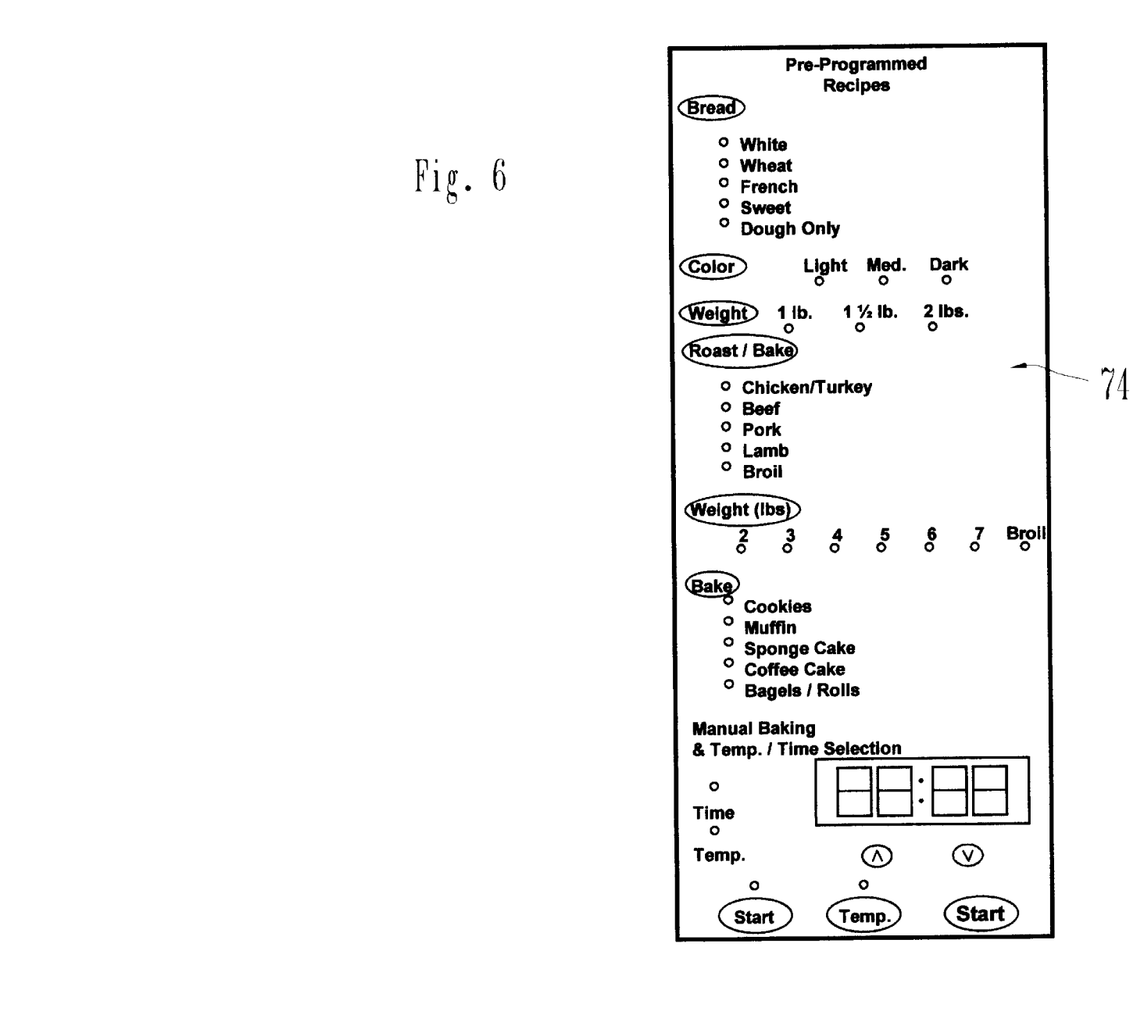
FIG. 6 is a front view of the control key pad of the appliance of FIG. 1.

FIG. 6 depicts the layout of a control panel 74. Actuation of associated controls enables electric switching gear to start and stop the electric motor 63. It mounts at the lateral compartment 43 on the right of the FIGS. 1 and 2. The lateral compartment 43 also houses any electronic equipment configured to operate these components with regard to timing and intensity as set by operation of the control panel 74. Typically the control panel 74 will be covered by a flexible, transparent membrane which is advantageously printed with a readily understood legend and which enables an individual to actuate the controls through the membrane. As shown in the drawing, the main functions are pointed out clearly by being surrounded by elliptical frames, while the various modes of cooking or baking are left in plain print.

Figure 7:
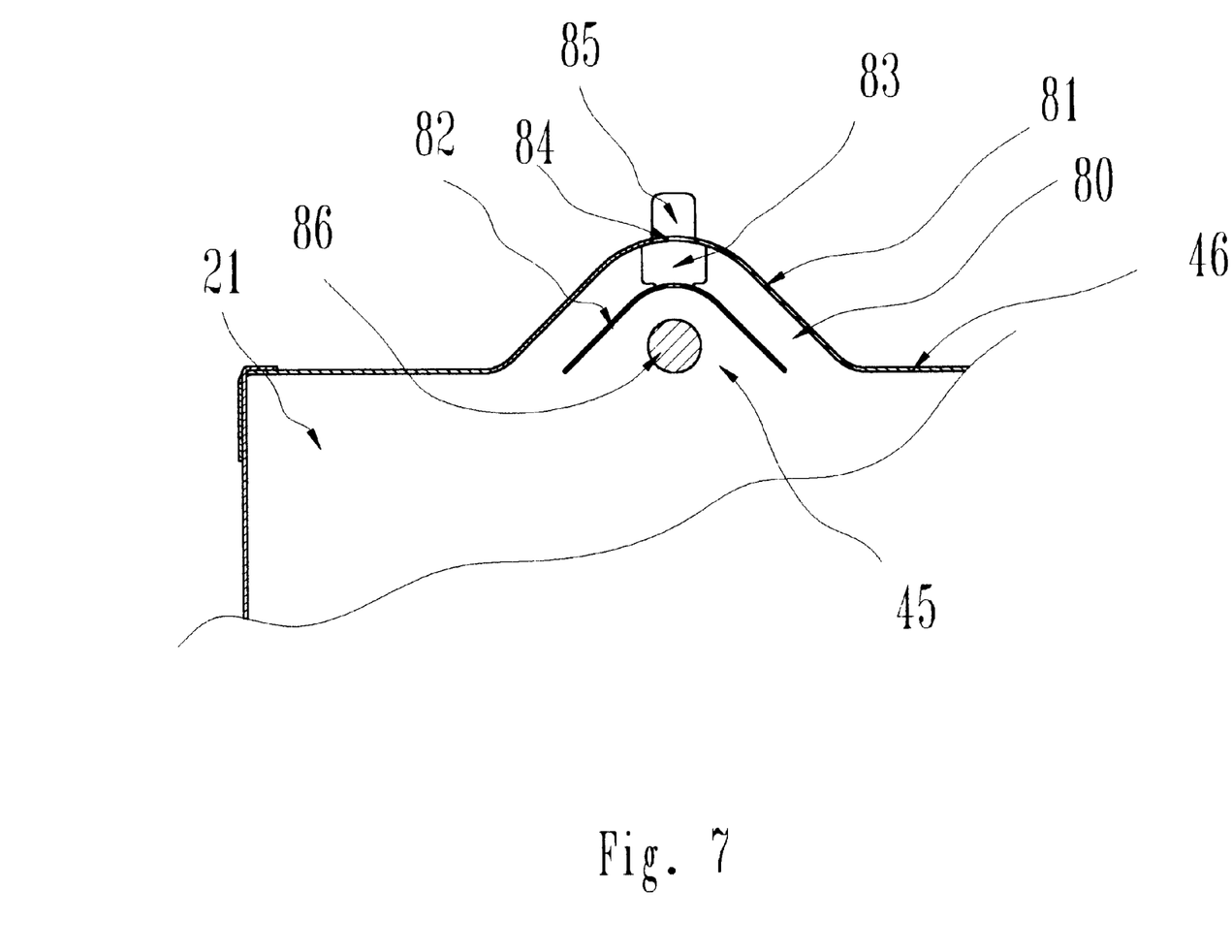
FIG. 7 is a part section of the reflector and of the sheathed heating element at the top of the baking chamber.

FIG. 7 illustrates the upper heating element 45 as it mounts to the top wall 46. More specifically the heating element 45 is carried in a downward facing channel 80 formed by deflecting or bending a section 81 of the top wall 46. The heating element 45 includes a reflector 82 supported by a plurality of spaced tabs 83. Each tab 83 passes through a preformed slot 84 with an upper portion 85 being twisted to lock each tab 83 and the reflector 82 in place. End supports, not shown in FIG. 7, space a heating unit 86 at a predetermined point relative to the reflector 82. The reflector 82 is formed of a bright metallic sheet strip. The channel 80 serves to protect the heating element 86 and the reflector 82 against contact with an accidentally high-rising bread loaf. It also redirects radiant energy from a heating element, such as an electrically energized resistive heating element, downward onto the dough in the pan 27. The same design can be employed for the heating element 25 located on the bottom of the chamber.

FIGS. 8 through 11 depict another embodiment of this invention in which an appliance 100 includes a cabinet 101 with a front opening door 102 with a handle 103 that pivots about hinges 104. As in FIG. 1 an oven chamber 105 includes a bottom heating element 106 mounted in a recess in a bottom wall 107. A bread making pan 110 like the pan 27, has a grip 111 and can be positioned on a drive assembly in the floor like the drive assembly 40 shown with particular reference to FIGS. 3 through 5.

Figure 8:
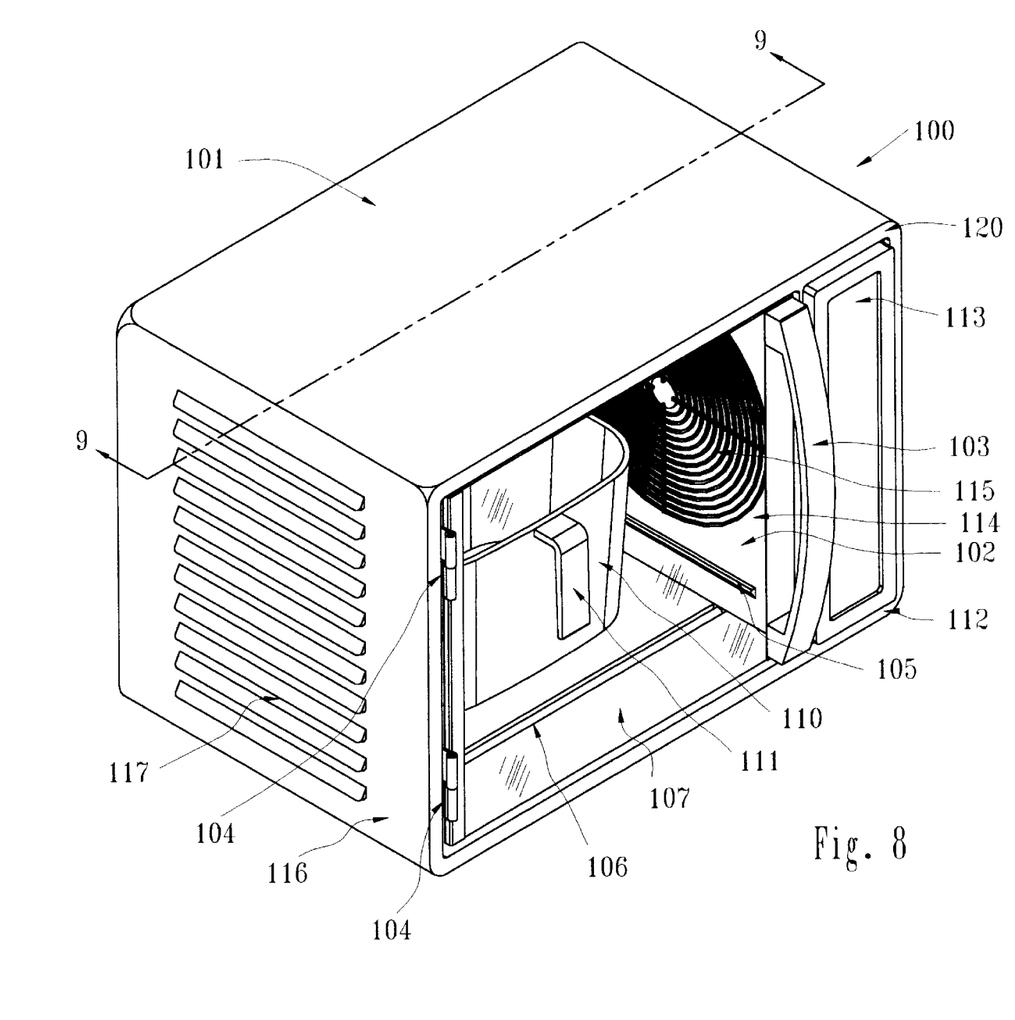
FIG. 8 is an isometric view of another embodiment of an assembled appliance with bread-making apparatus mounted in an oven.

The front opening nature of the door and the use of a lateral compartment 112 for carrying a control panel 113 provides a space at an intermediate dividing wall 114 to provide a convention heating element generally designated as 115. Such convection heating systems best operate when the heated air can be vented. The fact that the door is front opening provides an entire side wall 116, on the left side of the appliance 100 as shown in FIG. 8, that can be formed with a series of vents for providing such exhaust. Likewise the opposite side wall 120 can also be provided with vents to admit air into the lateral compartment of 112.

Figure 9:
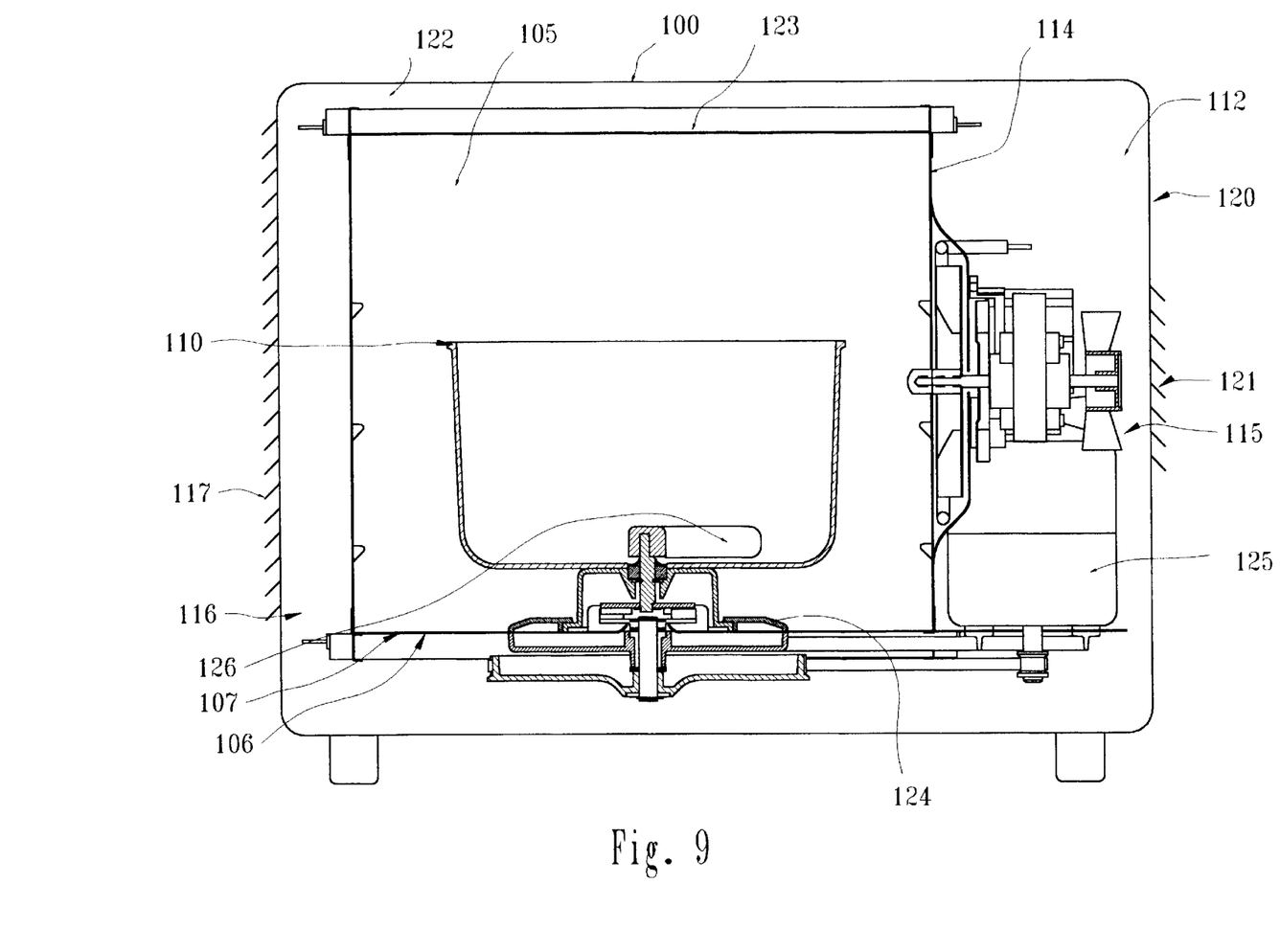
FIG. 9 is a section view taken along lines 9—9 in FIG. 8.

FIG. 9 depicts the appliance 100 with the left side wall 116 and vents 117 and with the right side wall 120 and vents 121 that admit air into the lateral compartment 112. The bottom wall 107 carries the bottom heating element 106 and a top wall 122 carries an upper heating element 123 in the same fashion as shown in FIGS. 3 through 5. In addition, the oven chamber 105 includes the drive assembly 124 mounted in the bottom floor of the bottom wall 107 for receiving the breadmaking pan 110 in this same fashion as the drive shown in FIGS. 1 through 5 receive the bread making pan 27. The lateral compartment 114 additionally includes an electric motor 125 that connects through a transmission to drive a kneading blade 126.

Figure 10:
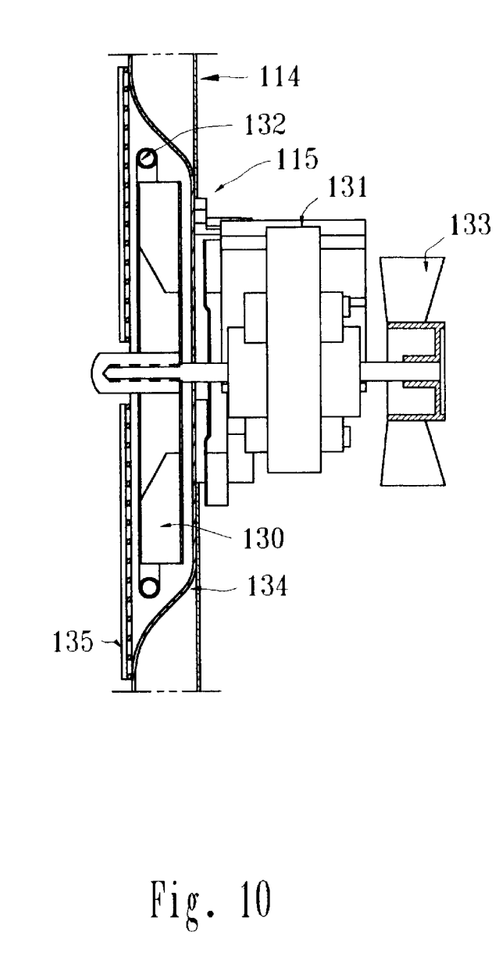
FIG. 10 is an enlarged section of a convection heater shown in FIG. 9.
Figure 11:
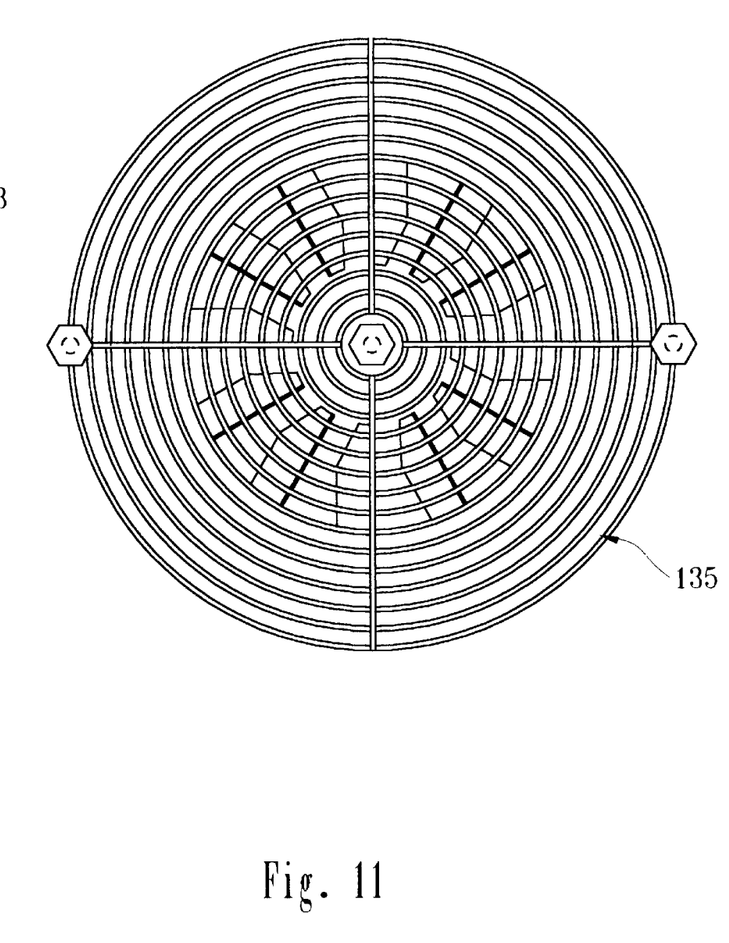
FIG. 11 is a plan view taken from the left of FIG. 10.

The convection heating element 115 is shown in greater detail in FIG. 10. More specifically, the convection heater includes a radial impeller 130 driven by another electric motor 131 which circulates air heated by an electric heating element 132 and pulled into the lateral compartment 114 by another fan 133. The impeller 130 and heating element 132 are surrounded by a cowl 134 that opens toward the oven. Heated air is driven by the impeller 130 radially toward the cowl 134. The cowl 134 redirects the flow toward the top, bottom, front and back of the oven chamber. This improves temperature uniformity throughout the oven chamber. A circular grill 135 can be attached as shown in plan view in FIG. 11, can be attached to the cowl 133 to prevent accidental contact with the heating element.

In summary, the two embodiments depicted in FIGS. 1 through 7 and in FIGS. 8 through 11 illustrate many of the advantages of this invention. In both embodiments the appliance has a cabinet with a front opening door. In both the bread making pan can be removed with the kneading apparatus attached. Thus the pan can be filled with ingredients remotely from the appliance and then inserted through the front opening without any requirement for top access, as is characteristic of many of the prior art appliances. Eliminating the need for top access also provides much greater flexibility in the positioning of heating elements within the oven chamber in order to provide better cooking results. For example, in a bread making process, the use of upper and lower heating elements, either in combination with each other or even in combination with a convection heating unit, provides more even heating of the bread dough and therefore provides a finished loaf of bread that has a more uniform consistency than would be available if the heating element were limited to the bottom or back walls of the oven heating chamber. Moreover, as will be apparent this advantage is achieved with a bread pan that is readily cleaned because the elements of the kneading blade can be easily removed for cleaning purposes.

It will also be apparent that a number of variations can be made to these specifically disclosed embodiments while still attaining some or all of the advantages and objectives of this invention. For example, both embodiments depict a drive mechanism for the kneading blade that includes a motor and a pulley and belt arrangement. Other direct or indirect drives could be utilized. A gear or chain transmission could replace the belt. A small diameter motor could be located in the bottom compartment in a horizontal alignment with a helical or crownwheel gear for driving the vertical shaft. A single kneading blade structure has been disclosed. Other transmissions for operating blades in parallel might be utilized in a system in which the bread pan is elongated in order to provide complete kneading capabilities. Specific combinations of heating elements have been disclosed and will be apparent that a variety of heating elements could be utilized.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed as new and desired to be secured by Letters Patent of the United States is:

1. A combination oven and bread making appliance comprising:
   A. a housing having an oven chamber including a bottom wall with a heating element, a lateral compartment and a bottom compartment formed therein,
   B. a removable bread making pan having an open top, a closed bottom, a rotatable kneading blade and a first rotatable shaft connected at one end to said kneading blade and extending through said closed bottom,
   C. a second rotatable shaft extending between said bottom compartment and said oven chamber,
   D. drive means in said lateral compartment for driving said second rotatable shaft,
   E. locating means for enabling said removable bread making pan to be slid parallel to said bottom wall into a predetermined fixed position within said oven chamber, and
   F. means connected to said first and second shafts for coupling rotation of said second shaft to said first shaft when said removable bread making pan is at the predetermined position.

2. An appliance as recited in claim 1 wherein said oven chamber includes a rear wall, two side walls, a top wall, a bottom wall and an open front closable by a door, said housing surrounding said oven chamber walls, said housing being spaced from one of said rear and side walls to form said lateral compartment and being spaced from said bottom wall to form said bottom compartment.

3. An appliance as recited in claim 1 wherein said heating element includes means for connection to said oven chamber top wall.

4. An appliance as recited in claim 3 wherein said heating element comprises a radiant heating element.

5. An appliance as recited in claim 1 wherein said heating element is attached to a wall intermediate said oven chamber and said lateral compartment.

6. An appliance as recited in claim 5 wherein said heating element comprises a convection heating element.

7. An appliance as recited in claim 1 additionally comprising control means connected for controlling said heating element and said drive means and a user interface control panel for providing inputs to said control means, said control means being located in said lateral compartment and said user interface control panel closing on side of said lateral compartment to be accessible to a user.

8. An appliance as recited in claim 1 wherein said locating means comprises channel means on said oven chamber bottom wall and rails on the bottom of said bread making pan for sliding into said channel means whereby said bread making pan is clamped in position in said oven chamber.

9. An appliance as recited in claim 1 wherein said drive means comprises an electric motor mounted in said lateral compartment having an output shaft parallel to said second shaft and having a drive pulley of a given diameter attached thereto, said second shaft having a driven pulley attached thereto in said bottom compartment with a diameter greater than the diameter of said drive pulley, said drive means additionally comprising a drive belt attached to said drive and driven pulleys.

10. An appliance as recited in claim 1 wherein a wall intermediate said oven and lateral chambers includes a passage therethrough, wherein said heating element comprises a convection heating means including a heating element and fan supported in said lateral chamber whereby said fan forces heated air into said oven chamber and wherein said passage is closed by a perforate cover.

11. A combination oven and bread making appliance comprising:
   A. a housing having an oven chamber, a lateral compartment and a bottom compartment formed therein, said oven chamber being bounded by top, back, bottom and side walls thereby to form a front-opening oven chamber,
   B. a door attached to said housing for closing said front-opening chamber,
   C. a removable bread making pan having an open top, a closed bottom, a rotatable kneading blade and a kneading blade rotatable shaft connected at one end to said kneading blade and extending through said closed bottom,
   D. locating means for enabling said removable bread making pan to be slid parallel to said bottom wall into a predetermined position within said oven chamber,
   E. drive means in said housing for driving said kneading blade rotatable shaft when said pan is at the predetermined position, and F. a heating element located in said oven chamber at an upper surface thereof.

12. An appliance as recited in claim 11 wherein said housing is spaced from one of said rear and side walls to form said lateral compartment and being spaced from said bottom wall to form said bottom compartment.

13. An appliance as recited in claim 12 wherein said heating element comprises a radiant heating element.

14. An appliance as recited in claim 13 additionally comprising control means connected for controlling said radiant heating element and said drive means and a user interface control panel for providing inputs to said control means, said control means being located in said lateral compartment and said user interface control panel closing on side of said lateral compartment to be accessible to a user.

15. An appliance as recited in claim 13 wherein said locating means comprises channel means on said oven chamber bottom wall and rails on the bottom of said bread making pan for sliding into said channel means whereby said bread making pan is clamped in position in said oven chamber.

16. An appliance as recited in claim 13 wherein said drive means comprises an electric motor mounted in said lateral compartment having an output shaft parallel to said kneading blade rotatable shaft and an other shaft coupled to said kneading blade rotatable shaft for rotation therewith, said drive means additionally having a drive pulley of a given diameter attached to said output shaft and having a driven pulley attached to said other shaft in said bottom compartment with a diameter greater than the diameter of said drive pulley, said drive means additionally comprising a drive belt attached to said drive and driven pulleys.

* * * * *

UNITED STATES PATENT AND TRADEMARK OFFICE
CERTIFICATE OF CORRECTION

PATENT NO. : 5,901,637
DATED : May 11, 1999
INVENTOR(S) : Glucksman et al.

It is certified that error appears in the above-identified patent and that said Letters Patent is hereby corrected as shown below:

Column 9, line 26, delete "on" and insert -- one --

Column 9, line 14, delete "on" and insert -- one --

Signed and Sealed this

Twenty-third Day of November, 1999

*Attest:*

Q. TODD DICKINSON

*Attesting Officer*  *Acting Commissioner of Patents and Trademarks*